(12) United States Patent
Webb et al.

(10) Patent No.: US 11,604,460 B2
(45) Date of Patent: Mar. 14, 2023

(54) HYBRID PLANT MPC MODEL INCLUDING DYNAMIC MPC SUB-MODELS

(71) Applicant: HONEYWELL INTERNATIONAL INC., Morris Plains, NJ (US)

(72) Inventors: Christopher J. Webb, Scottsdale, AZ (US); Sanjay Kantilal Dave, Karnataka (IN); Lucy Ning Liu, Chandler, AZ (US); Michael Paul Niemiec, Dexter, MI (US)

(73) Assignee: Honeywell International Inc., Charlotte, NC (US)

( * ) Notice: Subject to any disclaimer, the term of this patent is extended or adjusted under 35 U.S.C. 154(b) by 423 days.

(21) Appl. No.: 16/789,660

(22) Filed: Feb. 13, 2020

(65) Prior Publication Data
US 2021/0255610 A1  Aug. 19, 2021

(51) Int. Cl.
*G05B 19/418* (2006.01)
*G06F 30/18* (2020.01)
*G05B 13/04* (2006.01)

(52) U.S. Cl.
CPC ..... *G05B 19/41885* (2013.01); *G05B 13/048* (2013.01); *G06F 30/18* (2020.01); *G05B 2219/31376* (2013.01)

(58) Field of Classification Search
None
See application file for complete search history.

(56) References Cited

U.S. PATENT DOCUMENTS 9,122,261 B2 * 9/2015 Lu .................. G05B 19/042
10,379,503 B2   8/2019 Lu

OTHER PUBLICATIONS

Balogun, Lanre "Visualization of Fault Propagation Paths in Process Monitoring System", Aalto University School of Chemical Technology, Master's thesis for the degree of Master of Science in Technology submitted for inspection, Jan. 7, 2015. (Year: 2015).*

* cited by examiner

*Primary Examiner* — Carlos R Ortiz Rodriguez
(74) *Attorney, Agent, or Firm* — Bookoff McAndrews, PLLC (57) ABSTRACT

A method of generating a hybrid model predictive control (MPC) simulation model for a plant configured to run a process that processes at least one raw material to generate at least one tangible product. A predictive dynamic MPC sub-model is provided for each of plurality of process units in the plant, the plant including at least one process controller coupled to field devices coupled to the plurality of process units, where the process units comprise equipment for converting the raw material or an intermediate material formed from the raw material into to another material. A piping network diagram is obtained that provides a representation of a piping network for routing of the raw material and the intermediate material during the process. The dynamic MPC sub-models are coupled together using the piping network to generate the hybrid MPC simulation model which models the plant as a whole.

20 Claims, 3 Drawing Sheets

HYBRID PLANT MPC MODEL INCLUDING DYNAMIC MPC SUB-MODELS

FIELD

This Disclosure generally relates to industrial process control and automation systems. More specifically this Disclosure relates to multi-variable model predictive control (MPC) for plants.

BACKGROUND

Industrial process control and automation systems are commonly used to automate large and complex industrial processes. These types of control and automation systems routinely include process controllers and field devices including sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process.

For example, in industrial processes, a controlled variable (CV) generally represents a process variable that can be measured or inferred and that is ideally controlled to be at or near a desired setpoint or within a desired range of values. A manipulated variable (MV) generally represents a process variable that can be adjusted in order to alter one or more CVs. A disturbance variable (DV) generally represents a process variable whose value can be considered but cannot be controlled. As a simple example, a flow rate of material through a pipe could denote a CV, a valve opening for a valve that controls the flow rate of material could denote a MV, and the ambient temperature around the pipe or the valve could denote a DV.

Chemical plants such as refineries conventionally use a flowsheet model of the plant to optimize actual plant operations. For production planning purposes, the flowsheet representation is known to be a steady state model relating the mass flow and qualities of materials starting with the raw materials, and ending with the final products produced by the process. Flowsheets can also be used with a process simulator (such as the Honeywell International UNISIM Operations) and may comprise dynamic models. Flowsheet models represent the production chain and contain a number of interconnected, independent subunit models that each represent the respective process units in the production chain. The flowsheet is often displayed in a graphical user interface.

Some commercially available MPC products provide a whole plant (holistic) optimization technology, including the PROFIT EXECUTIVE provided by Honeywell International. Such MPC products use a dynamic model to optimize the production chain, but do not directly integrate a flowsheet into the MPC model because such commercially available MPC products instead rely on a user-generated holistic dynamic model to relate the impact of operational changes on the end-product production and quality.

SUMMARY

This Summary is provided to introduce a brief selection of disclosed concepts in a simplified form that are further described below in the Detailed Description including the drawings provided. This Summary is not intended to limit the claimed subject matter's scope.

As described above, commercially available MPC simulation model products do not directly integrate a flowsheet because they instead rely on a user-generated dynamic model of the whole plant to relate the impact of operational changes on end-product production and quality. Disclosed aspects include a hybrid plant MPC simulation model that can be used to simulate process behavior, and disclosed hybrid plant MPC simulation models can provide the MPC model needed by the respective MPC controllers to enable control of the individual process units.

The hybrid plant MPC simulation model includes dynamic MPC sub-models for the respective process units and a representation of the actual piping network, such as a flowsheet model, that enables linking the process unit behavior together, where the actual piping network is the physical tubing/piping used to transport materials between the process units. The representation of the piping network, such as obtained from a flowsheet, functions to define the routes taken by the in-process material between the process units, to generate a hybrid plant MPC simulation model from the dynamic MPC process unit models. Disclosed hybrid plant MPC simulation models have advantages including providing flexibility when adding new process units to the plant, changing existing process units, or redesigning the piping network in the plant.

Disclosed aspects recognize commercially available MPC simulation model products cannot handle the complexities of adding routing variables. A conventional MPC simulation model product needs to be reconfigured if a routing variable is added because such conventional dynamic MPC simulation models rely on a fixed design for the material flows between the respective process units. If the piping network changes, so that material becomes routed to a new process unit or a material becomes routed in a different way, a conventional dynamic MPC simulation model of the whole plant must be reconfigured. In contrast, with a disclosed hybrid plant MPC simulation model, changes can be made to the representation of the piping network, and the existing dynamic MPC models of the respective process units can remain the same. In the case of a change, the hybrid plant MPC simulation model can then be recomputed from its parts (the dynamic MPC sub-models of the process units, and the updated representation of the piping network), which can then be used by plurality of multi-variable MPC controllers to enable separate MPC control of each of the process units.

This Disclosure includes a method and related simulation system based on a disclosed hybrid plant MPC simulation model which localizes the MPC model dynamics to the individual process units. As defined herein, the term 'process unit' means the equipment assembled and connected by pipes and ducts to process raw materials and to manufacture either a final or intermediate product used in the on-site production of other products. The term 'process unit' as used herein also includes apparatus for the purification of recovered byproducts.

By using a variety of different process units, one can globally model the plant's overall conversion of the initial raw materials into one or more end products. The models of these process units are then coupled together by the representation of the piping network (or a routing network). The piping network is known to be a physical network of pipes transporting the flow of materials between the respective process units. Schematically, the piping network is represented as a series of lines connecting the process units on the flowsheet. In other words, the flowsheet is a schematic representation (model) of the plant including all the process units in the plant, and the allowed material flows between the respective process units.

Flowsheets are known to be intentionally abstract and thus do not include any significant detail. More detailed information about the routing flows can be found in a Process Flow Diagram (PFD) or a Piping & Instrumentation Diagram (P&ID), which as an alternative to flowsheets can provide the representation of the piping network to enable a disclosed hybrid plant MPC simulation model to be generated from a plurality of dynamic MPC sub-models of the process units, which as described above enables a whole plant to have its performance optimized by generally a plurality of multi-variable MPC controllers through control of the individual process units. As described above, this Disclosure eliminates the need to create a single global (whole plant) dynamic MPC simulation model, yet still allows for global plant optimization.

One disclosed embodiment comprises a method of generating a hybrid MPC simulation model for a plant configured to run a process that processes at least one raw material to generate at least one tangible product. A predictive dynamic MPC sub-model is provided for each of a plurality of process units in the plant, the plant including at least one process controller coupled to field devices coupled to the plurality of process units, where the process units comprise equipment for converting the raw material or an intermediate material formed from the raw material into to another material. The final material produced by the plant is generally referred to herein as an end product. A piping network diagram is obtained that provides a piping network representation of a configuration of piping for writing the raw material and the intermediate material during the process. The dynamic MPC sub-models are coupled together using the piping network representation to generate the hybrid MPC simulation model which models the plant as a whole, meaning a complete model of the plant from receipt of raw materials to the outputting of end products.

BRIEF DESCRIPTION OF THE DRAWINGS

FIG. 1 does not directly show the model predictive nature of the three process units, CDU, HDS1, and HDS2. These unit representations do contain dynamic models relating, for example, a change in CDU_LGO flow to a change in the crude flow.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility (IPF) or simply a "plant" runs an industrial process involving a tangible material that disclosed embodiments apply. For example, oil and gas, chemical, beverage, pharmaceutical, pulp and paper manufacturing, petroleum processes, electrical, and water. An IPF is distinct from a data processing system that only performs data manipulations.

As noted above, commercially available model predictive process control products (such as the Honeywell International PROFIT EXECUTIVE) require the development of dynamic models configured for modeling the plant is a whole. As recognized herein such development can become unwieldy as the complexity determined by factors including the number of process units and complexity of the network linking the process units (i.e. number of paths from raw materials to end products) of the plant increases. This is no longer a requirement with a disclosed hybrid plant MPC model generated by embedding of dynamic models for each process unit enabled by piping connections provided for example by a traditional flowsheet is believed to be a unique feature. This Disclosure is believed to be the first to specifically embed dynamic MPC sub-models for each of the process units in a routing flow (e.g., flowsheet) framework to allow for the dynamic optimization of the whole plant using MPC technology.

Disclosed aspects use a mixed hybrid model to relate the changes occurring in the process units to their outlet streams. These, in turn, affect downstream process units acting as inputs (MVs and DVs) to the dynamic models of these process units. The interactions between the continuous, dynamic process unit MPC sub-models and the routing network allow creating a global, dynamic model from the raw material, shown as described below in FIG. 1 as crude oil (crude) 102, to the end products shown as LGO and LE. This mixed hybrid model, in turn, can be used by commercially available model predictive process control products such as the Honeywell International PROFIT SUITE. The PROFIT SUITE is the brand name for a collection of Honeywell international' products related to advance process controller and optimization, and includes the PROFIT CONTROLLER and the PROFIT EXECUTIVE. In short, these technologies all use a dynamic model to predict process changes, optimize process operation provide an optimal operating point, and then control to this optimal operating point. A dynamic model is a key to this.

This Disclosure also includes a methodology for generating a holistic dynamic model using dynamic models for the individual process units and a routing network (flowsheet) showing material flows between units. The disclosed methodology captures changes occurring both inside a process unit (e.g. effects of throughput on intermediate product quality) and changes in the routing flows (e.g. changing the fractions of material sent to two units running in parallel), to optimize the plant while controlling the key variables.

Disclosed aspects thus only require smaller, simpler to obtain dynamic models of the individual process units, and a routing map detailing the routing of the material being processed. This routing map is generally obtained from the customer's existing flowsheet. Other ways to obtain this routing map can be from PFDs or P&IDs. By simplifying the development of the whole plant model, project teams will save time and effort when implementing. Furthermore, model maintenance is expected to be significantly reduced as individual process units are modeled. One can also add one or more new process units or change available routing paths to provide an updated model without redoing the whole plant model.

Disclosed aspects also allow inclusion of additional non-dynamic elements, such as tanks, manifolds, and blenders in the hybrid MPC simulation model. In this context, non-dynamic elements such as tanks, manifolds and blenders are not process units as used herein. Objects such as manifolds and blenders are static, that is they do not require a dynamic model as their response is nearly instantaneous. At any given time, their output flows and qualities are essentially completely dependent on the current inlet flows and qualities. Tanks are dynamic and dependent on the tank level, but this simple dynamic element can be directly embedded. Accordingly, it is not needed to have a dynamic MPC sub-model be created for these non-dynamic elements, or other similar elements.

Regarding the type of data and where will reside, operating data with key variables for flowsheet are captured. This data can be retained by a PROFIT EXECUTIVE application and can be stored to a local historian. Disclosed aspects can work together with a MPC product, such as the PROFIT EXECUTIVE that implements a configuration including upper-tier controller (generally corresponding to level 4 of the Purdue model) and a lower-tier controller (see generally corresponding to level 3 of the Purdue model), where for the PROFIT EXECUTIVE the lower-tier MPC (process unit level) controller is called the secondary controller and the upper-tier MPC controller is called the primary controller.

U.S. Pat. No. 10,379,503 to Lu et al entitled "Apparatus and method for calculating proxy limits to support cascaded model predictive control (MPC)", is incorporated by reference herein, which shows a multilevel controller arrangement, such as in FIG. 1, that includes controllers at level 1 through 5 of the Purdue model. Operating data for key variables are collected inside the PROFIT EXECUTIVE controller and are used to update product flow and quality predictions for each of the process units. This Disclosure takes these process unit predictions and predicts the effects on the overall plant by coupling the product changes in an upstream process unit to those in a downstream process unit. This same mechanism allows disclosed aspects to construct a dynamic end to end model (raw material to final products). Using this dynamic model, an MPC product such as the PROFIT EXECUTIVE, can optimize the whole plant and develop a control strategy to move the plant to the optimal operating point.

Figure 1:
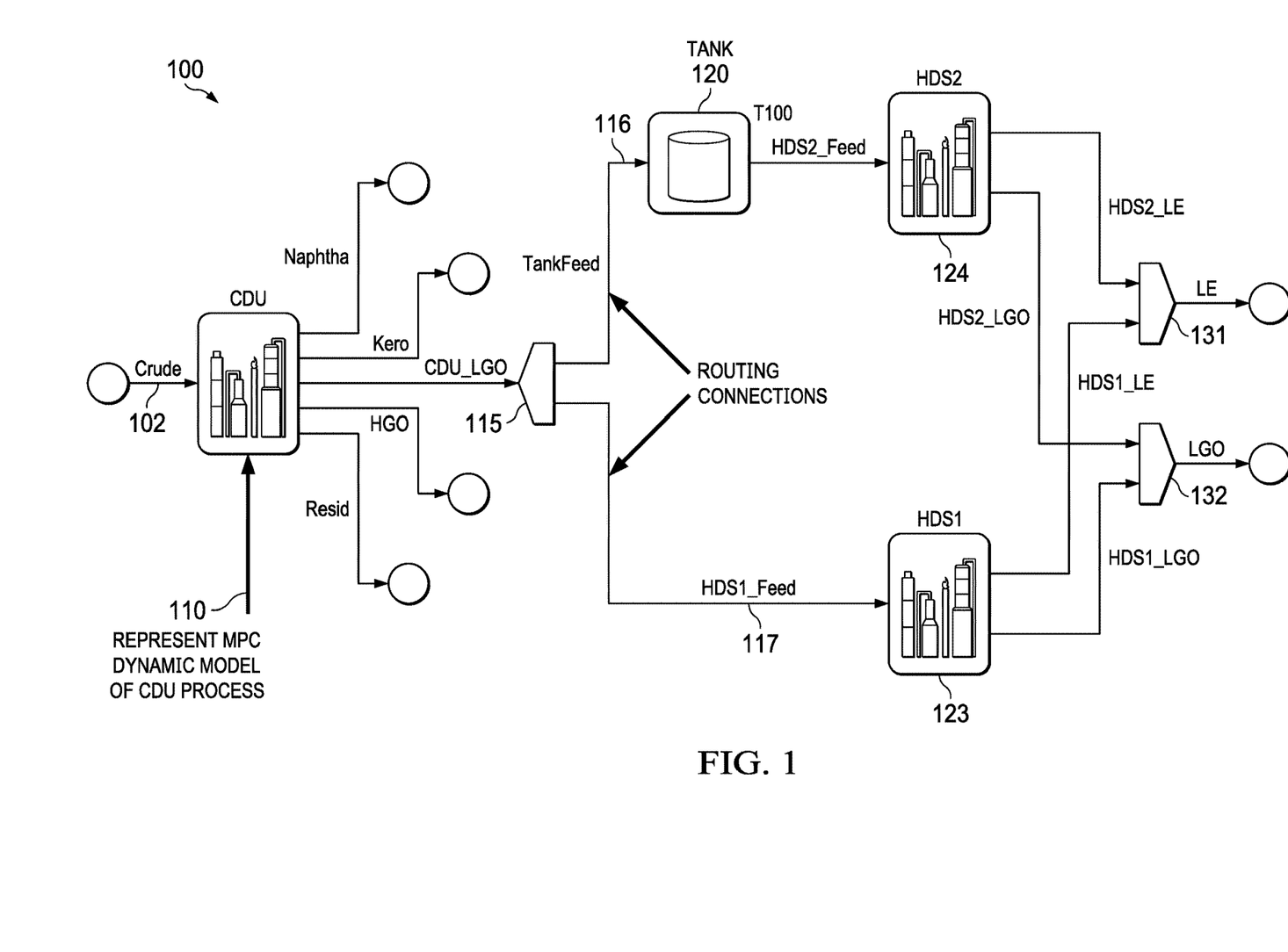
FIG. 1 shows an example depiction of a hybrid MPC simulation model of a plant that combines dynamic MPC sub-models of the process units with a representation of the piping network such as from a flowsheet model, shown by example for controlling a crude oil distillation process coupled to two parallel hydrotreaters, according to an example aspect. This drawing shows the flowsheet model with the material routing between crude unit and hydrotreaters and the final aggregation of the flows from the two hydrotreaters to the end light gas oil (LGO) product.

FIG. 1 shows an example depiction 100 of a combined multi-variable predictive control and flowsheet model for plants shown by example for a crude oil distillation process coupled to two parallel hydrotreaters, according to an example aspect. Crude oil is known to be a multi-component mixture including more than 100 different compounds. Petroleum refining or distilling refers to the separation as well as reactive processes (hydrotreaters in this scenario) to yield various commercially valuable products.

The plant includes a supply of crude oil shown as crude oil (crude) 102, where the plant is represented by an MPC dynamic model HO of the crude distillation unit (CDU) process unit. FIG. 1 for simplicity shows only an icon representing a process unit. However, that process unit needs a model predictive control dynamic model relating changes in operating conditions to output material flows and qualities of the process shown receiving shown receiving the crude 102. Primary crude oil cuts in a typical refinery include gases, light/heavy naphtha, kerosene, light gas oil, heavy gas oil and residue. From these intermediate refinery product streams the CDU process generates several final product streams such as fuel gas, liquefied petroleum gas (LPG), gasoline, jet fuel, kerosene, auto diesel, lubricants, bunker oil, asphalt and coke. Actually, the CDU produces a number of intermediate streams which will eventually become the products listed, but only after further processing. For simplicity in this example, the intermediate product streams are labelled as being products.

The CDU process is shown outputting five different outputs, shown as naptha, kero which is short for kerosene, heavy gas oil (HGO), CDU, LGO, and residue shown as 'resid.' Typical operating conditions for the CDU may be a temperature at the entrance of the furnace where the crude 102 enters is 200 to 280° C., where the crude 102 is then further heated to about 330 to 370° C. inside the furnace. The pressure may be maintained is about 1 barg. The CDU_LGO is shown provided to a stream splitter 115. Alternatively, the CDU_LGO stream is split in two by the stream splitter 115, which provides a first portion the CDU_LGO as a tank feed 116 routing connection to the tank 120 and a second portion of the CDU_LGO as a hydrodesulfurization (also known as a hydrotreater) HDS1_feed 117 routing connection to the HDS1 unit 123. The tank 120 provides HDS_2 feed to the HDS2 unit 124. The HDS units each have an MPC dynamic process model representation. The stream splitter 115 does not need an MPC dynamic process unit sub-model representation because the stream splitter 115 is an example of the above mentioned "manifold," and is thus not considered to be dynamic. However, there is a built-in splitter relationship that allows one to relate CDU_LGO changes to feeds of the two hydrotreaters HDS1 and HDS2.

In FIG. 1, dynamic MPC sub-models are only needed for each of the three process units, CDU, HDS1, and HDS2. The other elements shown have fixed models allowing to couple the changes from one process unit to the next processing, but do not require the development of dynamic models. For example, the stream splitter 115 splits the CDU_LGO steam into two separate streams. The sum of the two outlet stream flows must match the inlet flow. If one increases one outlet flow and keeps the inlet flow constant, then the other outlet flow needs to decrease in like amount. Also, any change to the quality of the CDU_LGO steam (e.g. density, viscosity, or flammability) is propagated to both outlet streams. This static model is part of the model for the stream splitter 115 which allows building the overall plant model. A user need not understand or enter models for the remaining elements shown in FIG. 1.

An HDS unit in the petroleum refining industry is also often referred to as a hydrotreater. Hydrodesulfurization is a catalytic chemical process widely used to remove sulfur (S) from natural gas and from refined petroleum products, such as gasoline or petrol, jet fuel, kerosene, diesel fuel, and fuel oils. The purpose of removing the sulfur, and creating products such as ultra-low-sulfur diesel, is to reduce the sulfur dioxide ($SO_2$) emissions that result from using those fuels in automotive vehicles, aircraft, railroad locomotives, ships, gas or oil burning power plants, residential and industrial furnaces, and other forms of fuel combustion.

The HDS1 and HDS2 units are both shown outputting light end, HDS1_LE and HDS2_LE, respectively, as well as light gas oil, HDS1_LGO and HDS2_LGO, respectively, commingling their respective streams via junctions 131 and 132. A junction is a mixing element whereby two or more streams are commingled. This term is used by another Honeywell International product, the PROFIT BLEND OPTIMIZER. Junctions 131 and 132 are included, with junction 131 shown receiving HDS 2_LE and HDS1_LE and outputting light ends (LE), and junction 132 HDS1 and HDS2 outputting light gas oil (LGO). The inputs to the junctions 131 and 132 provide all their routing connections. Every line shown in this diagram in FIG. 1 represents a routing connection. The junctions 131, 132 do not need an MPC dynamic process unit model representation, because as described above only process units receive dynamic models. As explained above, there is a built-in static model relating inlet flows to the combined outlet flow.

Figure 2:
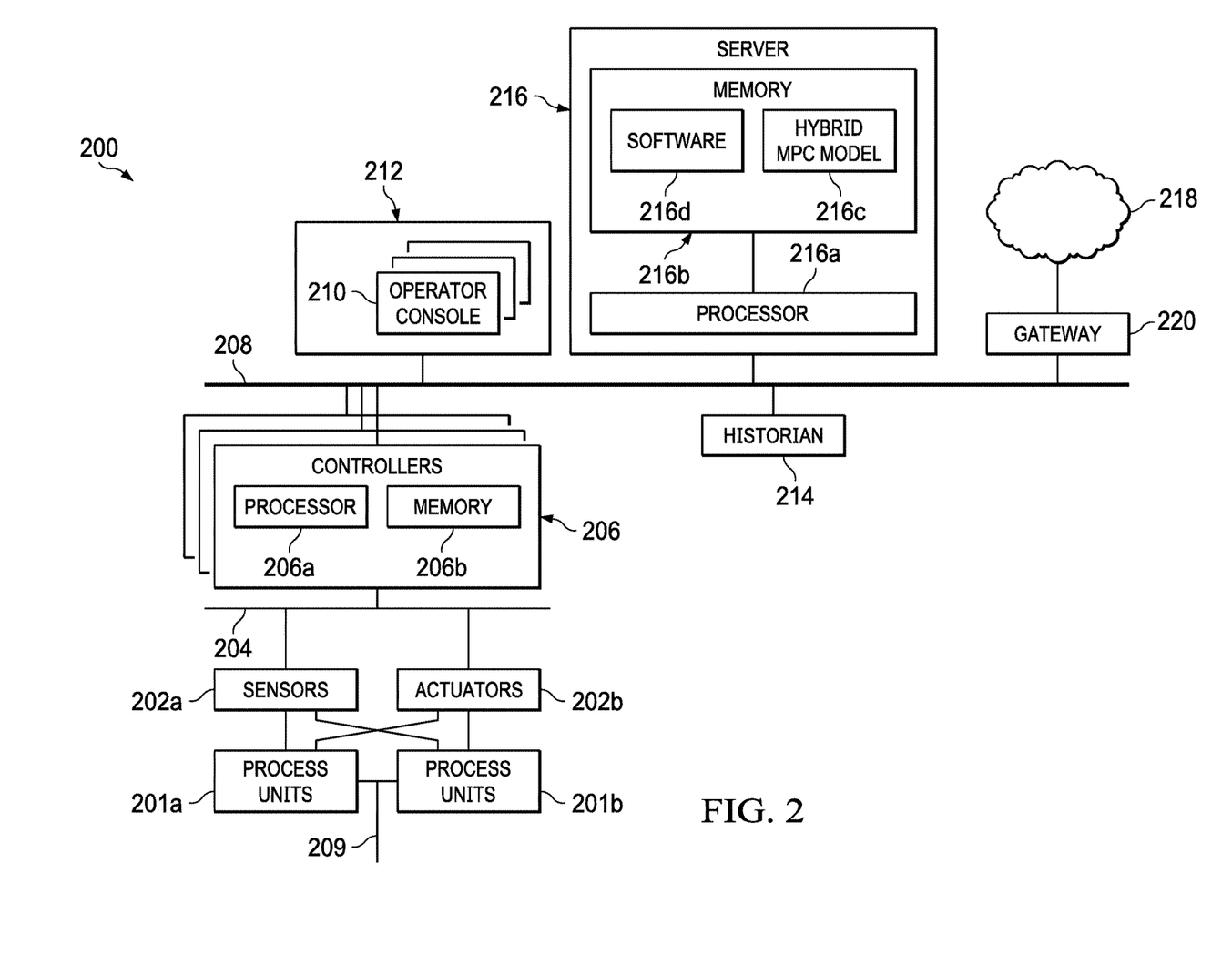
FIG. 2 illustrates an example industrial process control and automation system that can benefit from disclosed aspects.

FIG. 2 illustrates an example industrial process control and automation system 200 can benefit from disclosed aspects. As shown in FIG. 2, the system 200 includes various components that facilitate production or processing of at least one product or other tangible material. For instance, the system 200 can be used to facilitate control over components in one or multiple industrial plants. Each plant represents one or more processing facilities (or one or more portions thereof), such as one or more manufacturing facilities for producing at least one product or other tangible material. In general, each plant may implement one or more industrial processes, and can individually or collectively be referred to as a process system. A process system generally represents any system or portion thereof configured to process one or more products or other materials in some manner.

The system 200 includes field devices comprising one or more sensors 202a and one or more actuators 202b that are coupled between the controllers 206 and the processing equipment, shown in simplified form as process unit 201a coupled by piping 209 to process unit 201b. The sensors 202a and actuators 202b represent components in a process system that may perform any of a wide variety of functions. For example, the sensors 202a can measure a wide variety of characteristics in the process system, such as flow, pressure, or temperature. Also, the actuators 202b can alter a wide variety of characteristics in the process system, such as valve openings. Each of the sensors 202a includes any suitable structure for measuring one or more characteristics in a process system. Each of the actuators 202b includes any suitable structure for operating on or affecting one or more conditions in a process system.

At least one network 204 is shown providing a coupling between the controllers 206 and the sensors 202a and actuators 202b. The network 204 facilitates interaction with the sensors 202a and actuators 202b. For example, the network 204 can transport measurement data from the sensors 202a to the controllers 206 and provide control signals from the controllers 206 to the actuators 202b. The network 204 can represent any suitable network or combination of networks. As particular examples, the network 204 can represent at least one Ethernet network (such as one supporting a FOUNDATION FIELDBUS protocol), electrical signal network (such as a HART network), pneumatic control signal network, or any other or additional type(s) of network(s).

The system 200 also comprises various process controllers 206 generally configured in multiple Purdue model levels that may be present at all levels besides level 0, which only includes the field devices (sensors and actuators) and the processing equipment. Each process controller comprises a processor 206a coupled to a memory 206b. The process controllers 206 can be used in the system 200 to perform various functions in order to control one or more industrial processes.

For example, a first set of process controllers 206 corresponding to level 1 in the Purdue model may refer to smart transmitters or smart flow controllers, where the control logic is embedded in these controller devices. Level 1 controllers do not implement MPC. Level 2 generally refers to a distributed control system (DCS) controller, such as the C300 controller from Honeywell International. These level 2 controllers can also include more advanced strategies including machine level control built into the C300 controller, or another similar controller. Level 3 is generally reserved for controllers implemented by the server 216. These controllers interact with the other level (1, 2 and 4) controllers. MPC control can be implemented by controllers at level 2, but is generally implemented at level 3 and level 4. It is noted that not all control systems implement level 1, where the sensors and actuators (level 0) can be directly linked to a level 2 controller without any smart device in level 1. The C300 controller provides basic "loop" control as well as more advanced regulatory control schemes (including machine level control).

The level 1 controllers in the case of smart devices, or level 2 controllers such as the C300 controller, may use measurements from one or more sensors 202a to control the operation of one or more actuators 202b. The level 2 process controllers 206 can be used to optimize the control logic or other operations performed by the level 1 process controllers. For example, the machine-level controllers, such as DCS controllers, at Purdue level 2 can log information collected or generated by process controllers 206 that are on level 1, such as measurement data from the sensors 202a or control signals for the actuators 202b.

A third set of controllers implemented by the server 216 corresponding to level 3 in the Purdue model, known as unit-level controllers which generally perform MPC control, can be used to perform additional functions. The process controllers 206 and controllers implemented by the server 216 can collectively therefore support a combination of approaches, such as regulatory control, advanced regulatory control, supervisory control, and advanced process control. In one arrangement, the third set of controllers implemented by the server 216 comprises an upper-tier controller corresponding to level 4 in the Purdue model, which generally also performs MPC control, also known as a plant-level controller, coupled to a lower-tier controller corresponding to level 3 in the Purdue model.

The hybrid MPC simulation model generally resides in a memory (shown as hybrid MPC model 216c stored in memory 216b as shown in FIG. 2) associated with the upper-tier controller implemented by the server 216, wherein the upper-tier controller uses the hybrid MPC simulation model to predict movements in the process, participates in controlling the plant, and interacting with the hybrid MPC simulation model to optimize overall economics of the plant including sending an output from the hybrid MPC simulation model as setpoint targets to the lower-tier controller. The lower-tier controller uses the setpoint targets for diverting the raw material or the intermediate material in the piping network.

Each process controller 206, and the controller (s) implemented by the server 216, generally includes any suitable structure for controlling one or more aspects of an industrial process. At least some of the process controllers 206, and process controllers implemented by the server 216 could, for example, represent proportional-integral-derivative (PID)

controllers or multivariable controllers, such as controllers implementing MPC or other advanced predictive control (APC). As a particular example, each process controller can represent a computing device running a real-time operating system, a WINDOWS operating system, or other operating system.

At least one of the process controllers 206 shown in FIG. 2 could denote a model-based process controller that operates using one or more process models. For example, each of these process controllers 206 can operate using one or more process models, including a disclosed hybrid MPC simulation model, to determine, based on measurements from one or more sensors 202a, how to adjust one or more actuators 202b. In some embodiments, each model associates one or more MVs or DVs (often referred to as independent variables) with one or more CVs (often referred to as dependent variables). Each of these process controllers 206 could use an objective function to identify how to adjust its manipulated variables in order to push its CVs to the most attractive set of constraints.

At least one network 208 couples the process controllers 206 and other devices in the system 200. The network 208 facilitates the transport of information between to components. The network 208 can represent any suitable network or combination of networks. As particular examples, the network 208 can represent at least one Ethernet network.

Operator access to and interaction with the process controllers 206 and other components of the system 200 including the server 216 can occur via various operator consoles 210. Each operator console 210 can be used to provide information to an operator and receive information from an operator. For example, each operator console 210 can provide information identifying a current state of an industrial process to the operator, such as values of various process variables and warnings, alarms, or other states associated with the industrial process. Each operator console 210 can also receive information affecting how the industrial process is controlled, such as by receiving setpoints or control modes for process variables controlled by the process controllers 206 or process controller implemented by the server 216, or other information that alters or affects how the process controllers control the industrial process. Each operator console 210 includes any suitable structure for displaying information to and interacting with an operator. For example, each operator console 210 could represent a computing device running a WINDOWS operating system or other operating system.

Multiple operator consoles 210 can be grouped together and used in one or more control rooms 212. Each control room 212 could include any number of operator consoles 210 in any suitable arrangement. In some embodiments, multiple control rooms 212 can be used to control an industrial plant, such as when each control room 212 contains operator consoles 210 used to manage a discrete part of the industrial plant.

The system 200 may optionally include at least one data historian 214, and generally includes at least one server 216. The server 216 is generally in level 3 or 4 in the Purdue model. The server 216 includes a computing device shown as a processor 216a coupled to a memory 216b that stores a disclosed hybrid MPC simulation model 216c. The memory generally comprises on-transitory computer-readable medium. The processor 216a can comprise a digital signal processor (DSP), a microcontroller, an application specific integrated circuit (ASIC), a general processor, or any other combination of one or more integrated processing devices. Disclosed software for generating a disclosed hybrid MPC simulation model 216c also generally resides in one or more servers 216, shown as software 216d. The MPC controller utilizing the hybrid MPC simulation model 216c gathers measurement information from the process controllers 206, including other APC controllers, to adjust the dynamic portion of the hybrid model, synchronizing it to the process conditions. Once synchronized, the hybrid MPC simulation model generates the control structures necessary to control and optimize operations of the whole plant.

The data historian 214 represents a component that stores various information about the system 200. The data historian 214 can, for instance, store information that is generated by the various process controllers 206 during the control of one or more industrial processes. The data historian 214 includes any suitable structure for storing and facilitating retrieval of information. Although shown as a single component here, the data historian 214 can be located elsewhere in the system 200, such as in the cloud, or multiple data historians can be distributed in different locations in the system 200.

The server's 216 processor 216a executes applications for users of the operator consoles 210 or other applications. The applications can be used to support various functions for the operator consoles 210, the process controllers 206, or other components of the system 200. Each server 216 can represent a computing device running a WINDOWS operating system or other operating system. Note that while shown as being local within the system 200, the functionality of the server 216 can be remote from the system 200. For instance, the functionality of the server 216 can be implemented in a computing cloud 218, or in a remote server communicatively coupled to the system 200 via a gateway 220.

Although FIG. 2 illustrates one example of an industrial process control and automation system, various changes may be made to FIG. 2. For example, the system 200 can include any number of sensors, actuators, controllers, networks, operator consoles, control rooms, historians, servers, and other components.

Figure 3:
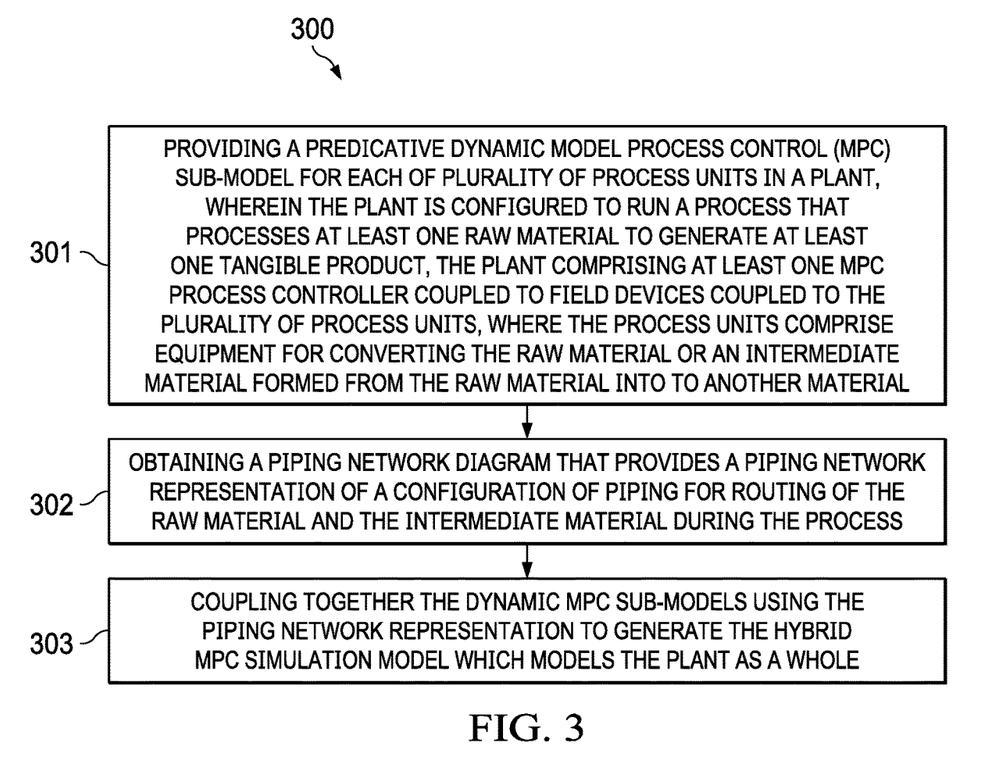
FIG. 3 is a flow chart that shows steps in a method generating a hybrid MPC simulation model for a plant, according to an example aspect.

FIG. 3 is a flow chart that shows steps in a method 300 generating a hybrid MPC simulation model for a plant, according to an example aspect. The plant is configured to run a process that generally processes at least one raw material to generate at least one tangible product. The method comprises step 301 comprising providing a predictive dynamic MPC sub-model for each of plurality of process units in the plant, the plant comprising one process controller coupled to field devices coupled to the plurality of process units, where the process units comprise equipment for converting the raw material or an intermediate material formed from the raw material into to another a material. Step 302 comprises obtaining a piping network diagram that provides a piping network representation of a configuration of the piping for routing of the raw material and the intermediate material during the process. Step 303 comprises coupling together the dynamic MPC sub-models using the piping network representation to generate the hybrid MPC simulation model which models the plant as a whole.

The method can further comprise having the hybrid MPC simulation model incorporated (embedded) in a memory associated with the plant-level controller, generally in level 4 so that it is an upper-tier controller, to provide control and optimization of the plant. This plant-level controller is generally coupled to a level 3 (lower-tier) controller comprising an MPC controller, with the process controller executing the hybrid MPC simulation model, the executing the hybrid MPC simulation model generally implementing APC, implementing an optimization to optimize the process for driving the process to an optimal operating point. The at least one process controller can comprise a plurality of process controllers, wherein the providing comprises sending the hybrid MPC simulation a model to the plurality of process controllers, and wherein some of the plurality of process controllers control individual ones of the process units.

Disclosed methods are generally implemented in a multilevel controller configuration, such as disclosed in Lu, comprising an upper-tier MPC controller corresponding to level 4 of a Purdue model, a lower-tier MPC controller corresponding to level 3 of the Purdue model, a machine controller corresponding to level 2 of the Purdue model such as a DCS, and optionally a lowest level controller corresponding to level 1 of the Purdue model that is directly coupled to the sensors and actuators that are on level 0 with the processing equipment. As noted above it is also possible for the level 2 or level 1 controller to interface with a smart device, e.g. a smart transmitter, at level 0.

In this arrangement, the providing can comprise sending the control output of the upper-tier (plant-level) controller employing the hybrid MPC simulation model directly as a setpoint to the lower-tier controller for diverting the raw material or the intermediate material in the piping network. The upper-tier controller, which can be called the production coordination controller, can use the hybrid model output to optimize the economics for the plant (overall). To implement the result of this optimization, the upper-tier controller can output these results. The hybrid MPC simulation model's outputs can also be sent as targets to a lower-tier controller (also known as the process unit MPC controller). However, the hybrid MPC simulation model output from the server 216 can also be sent directly as a setpoint to a regulatory controller corresponding to level 1 or level 2 of the Purdue model used to divert materials in the piping network. These regulatory controller(s) are not part of an MPC controller.

This Disclosure can be applied to applications beyond chemical or material processing. For example, to any continuous processing plant (as opposed to discrete manufacturing) with one or more connected process units. For one specific example, alumina production in the mining and metals industry.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method comprising:
providing a model predictive control (MPC) sub-model for each of a plurality of process units in a plant, the plant comprising at least one process controller coupled to field devices of the plurality of process units, wherein each of the plurality of process units comprise equipment for converting a raw material or an intermediate material formed from the raw material into another material;
obtaining a piping network diagram indicative of a piping network for routing of the raw material and the intermediate material; and
coupling the MPC sub-model of each of the plurality of process units in the plant using the piping network to generate a hybrid MPC simulation model for the plant.

2. The method of claim 1, wherein the obtaining the piping network diagram further comprises providing the piping network diagram by at least one of: a Process Flow Diagram (PFD), a Piping and Instrumentation Diagram (P&ID), and a process flowsheet.

3. The method of claim 1, further comprising:
providing the hybrid MPC simulation model to the at least one process controller; and
executing the hybrid MPC simulation model, by the at least one process controller, wherein the executing the hybrid MPC simulation model implements advanced process control (APC) and optimization for driving a process to an optimal operating point.

4. The method of claim 3, wherein the providing comprises: sending the hybrid MPC simulation model to at least one of a plurality of process controllers, and wherein the plurality of process controllers collectively control each of the plurality of process units.

5. The method of claim 3, further comprising collectively controlling each of the plurality of process units by the at least one process controller, wherein the at least one process controller comprises a plurality of process controllers comprising:
an upper-tier MPC controller corresponding to level 4 of a Purdue model,
a lower-tier MPC controller corresponding to level 3 of the Purdue model, and
a lowest level controller corresponding to level 1 or 2 of the Purdue model that is coupled to sensors and actuators;
wherein the hybrid MPC simulation model resides in a memory associated with the upper-tier MPC controller, wherein in the upper-tier MPC controller uses the hybrid MPC simulation model to predict movements in a process, participate in controlling the plant, and interacting with the hybrid MPC simulation model to optimize the plant including sending an output from the hybrid MPC simulation model as setpoint targets to the lower-tier MPC controller, the lower-tier MPC controller using the setpoint targets for diverting the raw material or the intermediate material in the piping network.

6. The method of claim 1, further comprising:
modifying the hybrid MPC simulation model for the plant, wherein the modifying comprises at least one of:
adding an additional process unit or changing one of the plurality of process units, wherein the additional process unit comprises at least one of: a tank, a manifold, and a blender; and
generating a revised hybrid MPC simulation model based on the modifications.

7. A non-transitory computer-readable medium containing instructions that when executed cause at least one processor device to:
receive a model process control (MPC) sub-model for each of a plurality of process units in a plant, the plant comprising at least one process controller coupled to field devices of the plurality of process units, wherein each of the plurality of process units comprise equipment for converting raw material or an intermediate material formed from the raw material into another material;

obtain a piping network diagram indicative of a piping network for routing of the raw material and the intermediate material; and couple the MPC sub-model of each of the plurality of process units in the plant using the piping network to generate a hybrid MPC simulation model for the plant.

8. The non-transitory computer-readable medium of claim 7, wherein the instructions are configured to:

modify the hybrid MPC simulation model for the plant based on at least one of:

adding an additional process unit or changing one of the plurality of process units, wherein the additional process unit comprises at least one of: a tank, a manifold, and a blender; and generate a revised hybrid MPC simulation model.

9. The non-transitory computer-readable medium of claim 7, wherein to obtain the piping network diagram further comprises providing the piping network diagram by at least one of: a Process Flow Diagram (PFD), a Piping and Instrumentation Diagram (P&ID), and a process flowsheet for a process.

10. A model predictive process (MPC) controller, comprising:

a processor coupled to a memory containing instructions that when executed cause the processor to:

receive a model process control (MPC) sub-model for each of a plurality of process units in a plant, the plant comprising at least one process controller coupled to field devices of the plurality of process units, wherein each of the plurality of process units comprise equipment for converting raw material or an intermediate material formed from the raw material into another material;

obtain a piping network diagram indicative of a piping network for routing of the raw material and the intermediate material; and couple the MPC sub-model of each of the plurality of process units in the plant using the piping network to generate a hybrid MPC simulation model for the plant.

11. The MPC controller of claim 10, wherein the processor is further configured to:

modify the hybrid MPC simulation model for the plant by at least one of:

adding an additional process unit or changing one of the plurality of process units, wherein the additional process unit comprises at least one of: a tank, a manifold, and a blender; and generate a revised hybrid MPC simulation model.

12. The MPC controller of claim 10, wherein the MPC controller is further configured to use the hybrid MPC simulation model to: predict movements in a process, participate in controlling the plant, and send an output from the hybrid MPC simulation model as setpoint targets to a lower-tier controller for diverting the raw material or the intermediate material in the piping network.

13. The method of claim 1, further comprising recomputing the hybrid MPC simulation model in response to a change in the piping network for routing of the raw material and the intermediate material.

14. The method of claim 1, further comprising:

providing a prediction for at least one process change in the plant, wherein the prediction is determined based on an effect on a first process unit from amongst the plurality of process units due to at least one of: a change in the piping network or a change in the raw material or the intermediate material in a second process unit from amongst the plurality of process units, wherein the second process unit is downstream to the first process unit.

15. The MPC controller of claim 10, wherein the processor is further configured to:

provide a prediction for at least one process change in the plant, wherein the prediction is determined based on an effect on a first process unit from amongst the plurality of process units due to at least one of: a change in the piping network or a change in the raw material or the intermediate material in a second process unit from amongst the plurality of process units, wherein the second process unit is downstream to the first process unit.

16. The non-transitory computer-readable medium of claim 7, wherein the instructions are configured to:

recompute the hybrid MPC simulation model in response to a change in the piping network for routing of the raw material and the intermediate material.

17. The MPC controller of claim 10, wherein the processor is further configured to:

recompute the hybrid MPC simulation model in response to a change in the piping network for routing of the raw material and the intermediate material.

18. The method of claim 1, further comprising:

manipulating at least one process variable of the plant in response to detecting a change in the piping network for routing of the raw material and the intermediate material.

19. The non-transitory computer-readable medium of claim 7, wherein the instructions are configured to:

manipulate at least one process variable of the plant in response to detecting a change in the piping network for routing of the raw material and the intermediate material.

20. The MPC controller of claim 10, wherein the processor is further configured to:

manipulate at least one process variable of the plant in response to detecting a change in the piping network for routing of the raw material and the intermediate material.

* * * * *